United States Patent [19]

Emschermann et al.

[11] 3,880,007
[45] Apr. 29, 1975

[54] MEASURING TEMPERATURE IN A VERY-HIGH TEMPERATURE ENVIRONMENT

[75] Inventors: Hans Heinrich Emschermann; Bruno Fuhrmann; Dieter Huhnke, all of Braunschweig, Germany

[73] Assignee: Felten & Guilleaume Carlswerk AG, Cologne, Germany

[22] Filed: Feb. 21, 1974

[21] Appl. No.: 444,386

[30] Foreign Application Priority Data
Feb. 23, 1973 Germany............................ 2308887

[52] U.S. Cl. .............................. 73/362 AR; 73/359
[51] Int. Cl............................ G01k 1/12; G01k 7/00
[58] Field of Search .......... 73/339 R, 359, 362 AR; 235/92 MT

[56] References Cited
UNITED STATES PATENTS
| | | | |
|---|---|---|---|
| 2,523,471 | 9/1950 | Lally | 73/339 R X |
| 3,379,063 | 4/1968 | Schonberger | 73/362 AR |
| 3,472,074 | 10/1969 | Glang | 73/362 AR |
| 3,548,661 | 12/1970 | Lilly et al. | 73/362 AR |

Primary Examiner—Richard C. Queisser
Assistant Examiner—Frederick Shoon
Attorney, Agent, or Firm—Michael S. Striker

[57] ABSTRACT

A temperature-sensitive unit operative for generating an analog temperature-indicating electrical signal is placed in the very-high-temperature environment and generates a signal indicative of the temperature to which it is exposed. Also placed in the very-high-temperature environment is a heat-insulating container containing an electrical-energy-consuming electronic buffer storage circuit generating heat during operation and protected by the container from the heat of the very-high-temperature environment. The electronic buffer storage circuit is electrically connected to the temperature-responsive unit and is operative for receiving the analog temperature-indicating signal and temporarily storing a corresponding signal indicative of the value of the analog temperature-indicating signal. Subsequently, the electronic buffer storage circuit is brought into a cooler environment and is there connected to an electrical-energy-consuming readout device, such as a digital display device which generates heat during operation, and the stored signal is read out. This results in a slower build-up of temperature in the heat-insulating container than if the read-out device were incorporated therein. The electronic buffer storage circuit can include an analog-to-digital converter circuit, and preferably is a very small electronic circuit having a very low heat generation rate, to minimize the rate of temperature build-up in the heat-insulating container.

15 Claims, 6 Drawing Figures

MEASURING TEMPERATURE IN A VERY-HIGH TEMPERATURE ENVIRONMENT

BACKGROUND OF THE INVENTION

The invention relates to the measurement of temperatures in very-high-temperature environments.

It is frequently necessary to make a temperature measurement of an object located in an environment having a temperature in excess of the maximum permissible temperature to which conventional electronic temperature-measuring circuit arrangements can be raised. An example of this situation is the measurement of temperature in canned-goods cans during sterlization in an autoclave.

A conventional-measuring arrangement may for example include the following:
  a temperature-responsive element operative for generating an electrical analog signal indicative of the sensed temperature;
  an intermediate circuit which amplifies the analog signal, and possibly also digitalizes the analog signal; and
  an output stage which provides a visual indication in digital or analog form of the measured temperature and/or records the measured temperature.

Also, the temperature-measuring arrangement may further include a data-processing arrangement likewise connected to the intermediate circuit and operative for performing computations or other operations in dependence upon the sensed temperature.

It is known to encase such a temperature-measuring arrangement in a container of high heat-insulating effectiveness, to prevent the temperature of the electronic circuitry from rising to the level of the environmental temperature. The output stage of the temperature-measuring arrangement may for example include a registering device, so that successive measured values of temperature may be automatically or otherwise recorded in the form of a graph or numerical table, all within the aforementioned heat-insulating container.

With this known approach, the temperature of the components inside the heat-insulating container does increase undesirably, as a result of imperfect insulation, and furthermore as a result of the fact that the heat generated in the container by the electrical circuitry itself cannot escape from the heat-insulating container. However, this known approach can be successively employed, if the insulating material of the container is properly selected and dimensioned, and provided that the energy consumption of the enclosed electrical circuitry is maintained for predetermined time intervals at values corresponding to temperatures below the maximum permissible temperature to which the temperature-measuring arrangement can be safely raised.

One disadvantage of this approach is the space consumed by the registering apparatus and the considerable amount of energy consumed. Particularly if the registering apparatus is electromechanical, its energy consumption may be very high and serve to cause very fast temperature buildups inside the heat-insulating container. Additionally, the temperature-recording apparatus may be susceptible to damage resulting from jolts, which may necessitate the further provision in the heat-insulating container of motion-damping means, adding to the expense and bulk of the heat-insulating container.

To overcome these difficulties, it is known to avoid the approach of enclosing the entire temperature-measuring and recording arrangement in a heat-insulating container. It is known to instead measure the temperature of an object at a considerable distance from the object, so that the measuring and recording equipment will not be subjected to the very high temperature in the vicinity of the object. For example, it is known to position a temperature-sensitive element in heat-insulating relationship with the object whose temperature is to be measured, and then to connect the temperature-sensitive element to the measuring and recording equipment by means of lengthy wires. Also, it is known to provide a radio transmitter at the object to transmit a temperature-indicating radio signal, and to provide at a cooler remote location a radio receiver connected to the measuring and recording equipment. Additionally, it is known to establish an operative relationship between the temperature-sensitive element and the remotely located measuring and recording equipment by optical means.

The aforementioned use of long connecting wires between the temperature-sensitive element and the measuring and recording equipment is disadvantageous. Such wires, particularly when not fixedly mounted may interfere with the proper operation, for example, of a machine having moving parts and including or constituting the object whose temperature is to be measured. Such moving parts and/or the wires themselves may become damaged.

The aforementioned establishment of a radio-communications link between the temperature-sensitive means and the measuring and recording equipment requires the use of an otherwise unnecessary transmitter and receiver system, with the associated modulating and demodulating circuitry, all of which adds considerably to the expense of the arrangement. Also the radio-communication expedient may not be usable, for example, when measuring temperatures of objects located in enclosed metal containers, for example in autoclaves.

The known optical expedients likewise require special additional equipment, and are practical only in exceptional situations.

SUMMARY OF THE INVENTION

It is the general object of the invention to provide a method and apparatus for the measuring and/or recording of temperature of the types in question but not characterized by the above-enumerated disadvantages of the known methods and apparatuses.

This object, and others which will become more understandable from the following description of specific embodiments can be met, according to one advantageous concept of the invention, by first placing it in a very-high-temperature environment a temperature-responsive means operative for generating an analog temperature-indicating electrical signal indicative of the temperature to which the temperature-responsive means is exposed, and also placing in the very-high-temperature environment a heat-insulating container containing an electronic buffer storage circuit, protected by the container from the heat of the very-high-temperature environment and electrically connected to the temperature-responsive means and operative for receiving the analog temperature-indicating signal and temporarily storing a corresponding signal indicative of the value of the analog temperature-indicating signal. Thereafter, the electronic buffer storage circuit is brought into a cooler environment and there connected to a readout device located in the cooler environment, and is read out by the readout device to provide, for example a visual representation of the measured temperature.

* latter by definition exclusively consisting of electronic components such as transistors, diodes, resistors, capacitors, inductors, integrated circuits and others all serving but the transport of electrical charges or magnetic states and, whilst in operation, not performing any motion contrary to electromechanical components, said electronic buffer storage circuit . . . .

It is in particular an advantageous concept of the invention to split up the temperature measuring and/or recording arrangement into the temperature-responsive element located at the object whose temperature is to be determined, and into two further units, Unit I and Unit II.

Unit I, as one possibility, may consist of:
an analog-to-digital converter for converting the analog signal generated by the temperature-responsive element into a corresponding digital signal;
a register circuit capable of storing in electrical form the digital signal generated by the analog-to-digital converter;
auxiliary circuitry necessary for the operation of the analog-to-digital converter and the register circuit, for example an electronic clock, logic circuitry, etc.; and
the associated current supply.

Unit II, as one possibility, may consist of:
whatever other circuit components or devices are necessary to receive the stored digital information and to convert such digital information from electrical signal form into a digital or analog visual display, and/or to permanently record such information in analog or digital form, and/or to perform computations or other operations dependent upon the measured temperature.

For example, Unit II may include a digital display or recorder device, or may include a digital-to-analog converter connected to an analog recorder or display device.

The particular apparatus just described would be employed as follows: First, during the actual taking of the temperature of the object, Unit I is connected to the temperature-sensing element which is located in heat-exchanging relationship with the object in question. The temperature of the object is registered by Unit I in the form of electrical digital information. The temperature-sensing element may, for instance, be a temperature-dependent resistor or a thermoelement. After termination of the temperature-taking time interval t, the Unit I may at any convenient time be brought to a cooler remote location where the remainder of the temperature measuring and/or recording equipment (Unit II) is located. Unit I will then be operatively connected to Unit II, and the digital information temporarily registered by Unit I will be displayed in analog and-/or digital form by Unit II and/or permanently recorded in analog and/or digital form by Unit II, and/or Unit II may perform analog or digital computations using the measured temperature value or perform other operations dependent upon the measured temperature value.

The components in Unit I are characterized by their low energy consumption and heat dissipation and by their small space requirement. The registering circuit for temporarily registering electrical signals digitally representing the measured temperature can, for example, be of the commercially available integrated-circuit type conventionally employed as electronic buffer stores in electronic computers. Furthermore, the splitting up of the temperature measuring and/or recording apparatus into two units results in the possibility of enclosing Unit I in a relatively small heat-insulating container. Also, because fewer electrical components * will be located in the heat-insulating container, less heat will be generated inside the container, and the electrical components in the container can be operated for longer periods of time than otherwise possible.

* all exclusively of the electronic type and deliberately avoiding the electromechanical ones with their extreme heat generating . . . .

The binary-coded registering of the measured temperature in Unit I advantageously is performed by means of clock and counting circuitry. This can result in a reduction in energy consumption, since in the time intervals intermediate the clock pulses some or all of the electrical components can be rendered nonconductive. Also, for example, if the temperature-sensitive element is a temperature-sensitive resistor, the current flow through the resistor can be interruptued during such time intervals; this can significantly reduce the tendency of the temperature-sensitive resistor to heat up to a temperature greater than that to be measured as a result of its own current flow and internal heat generation. Of course, care must be taken that the commencement and termination of the clock pulse time intervals does not result in the development of undesirable interference effects.

The maximum permissible time period for which the Unit I can be maintained in operation will depend, inter alia, upon the heat-insulating effectiveness of the container and upon the heat capacity of the materials inside the container. This maximum permissible time period can be increased by incorporating in the heat-insulating container additional material of higher specific heat. The heat capacity and thus the maximum operating time can be still further increased by exploiting the melting heat of physical substances. It is possible, for example, to incorporate in the heat-insulating container a solid body of material, for example in the form of an aggregate, having a melting temperature below the maximum permissible temperature of the circuit components in the heat-insulating container.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
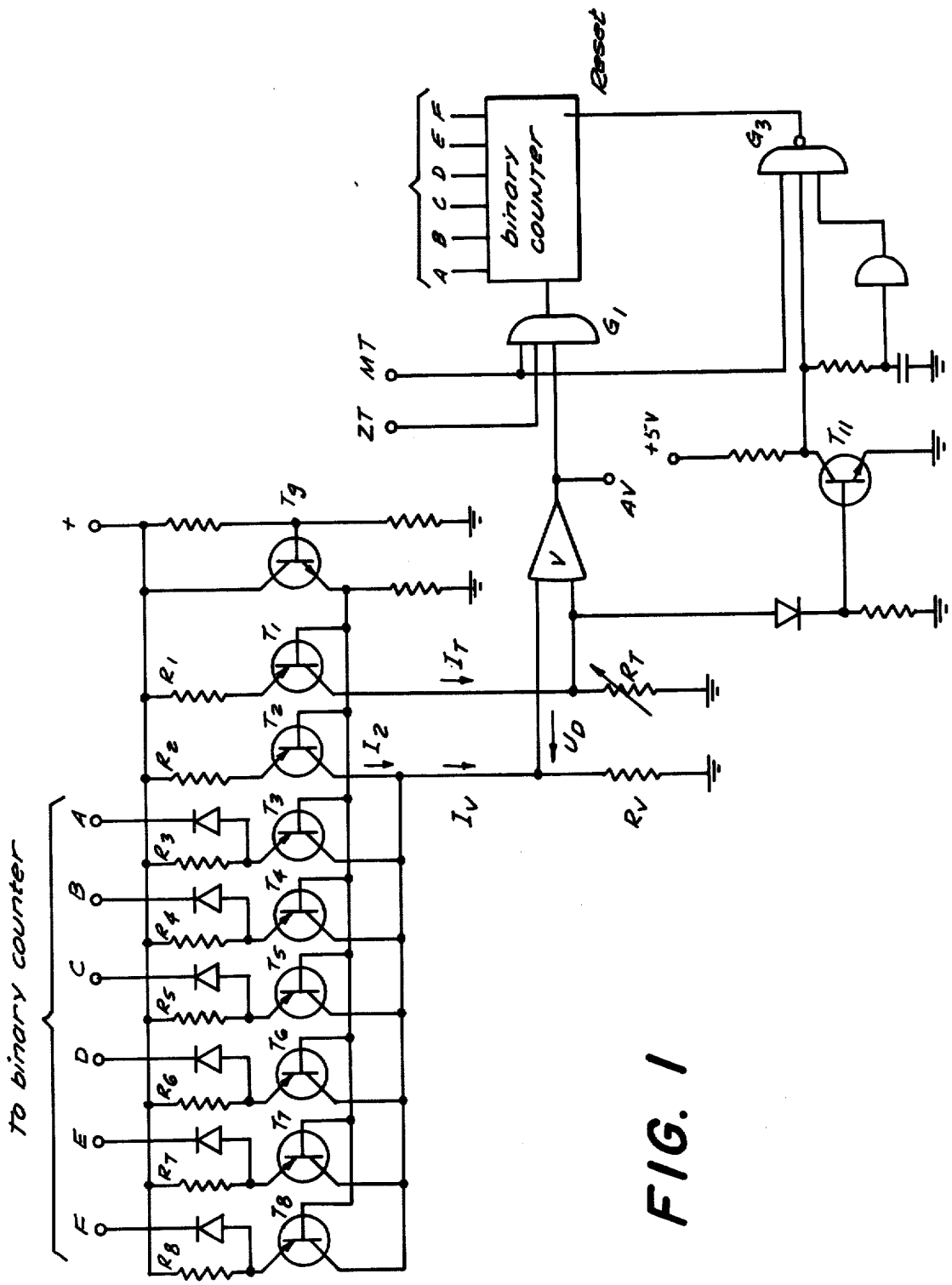
FIG. 1 depicts part of a temperature-measuring and -recording apparatus according to the invention.

FIG. 1 depicts a temperature-responsive resistor $R_T$ located in and fully exposed to the very-high-temperature environment, with the remainder of the circuitry in FIG. 1 being located in a heat-insulating container of high heat-insulating effectiveness and being electrically connected to temperature-responsive resistor $R_T$ to form therewith a temperature-measuring circuit operating on the compensation principle.

The circuit of FIG. 1 includes six constant current sources comprised essentially of six transistors T3 . . . T8, and furthermore includes two constant current sources T1, T2. The temperature-dependent resistor $R_T$ is supplied with a constant current $I_T$ from the current source T1. The temperature-independent resistor $R_V$ is supplied with a current $I_V$ provided by the constant current source $T_2$ and also provided by various ones of the transistor current sources T3 . . . T8. The constant component $I_2$ of the current $I_V$ can be adjusted, for example, by adjusting the value of resistor R2 to vary the reference point of the compensation arrangement.

The circuit performs as an analog-to-digital converter in the following manner:

Initially, the current sources T3 . . . T8 are all non-conductive, and the binary counter is at count zero, i.e., "0", are present at the six outputs A, B, C, D, E, F thereof. Counter clock pulses (see FIG. 2) are applied to the illustrated input ZT of the AND-gate G1, and minute gating pulses MT (see FIG. 2) are applied to the input MT of AND-gate G1.

If the temperature of the temperature-dependent resistor $R_T$ and accordingly its resistance value is greater than the preset reference value, then the voltage drop across resistor $R_T$ will be greater than the voltage drop across resistor $R_V$, and the voltage difference $V_D$ across the input of the amplifier V will be positive, resulting in the appearance of a "1" signal at the amplifier output AV, and the application of such "1" signal to the lowest input of AND-gate G1. Accordingly, the counter clock pulses applied to AND-gate input ZT become applied to the clock pulse input of the binary counter. The binary counter counts up from zero in the conventional manner.

As indicated in FIG. 1, the binary counter outputs A, B, C, D, E, F are connected to the cathodes of the diodes associated with the constant current sources T3 . . . T8. When a "0" signal is present at one of the counter outputs A to F, the cathode of the respective diode is substantially grounded, thereby in effect no current passes through the emitter-collector path of the associated one of transistors T3 . . . T8. On the other hand, when a "1" signal is present at one of the counter outputs A to F, the potential at the cathode of the respective diode is raised, and the current flowing through the respective one of resistors R3 . . . R8 will pass through the emitter-collector path of the respective transistor and then through the temperature-independent resistor $R_V$ located inside the heat-insulating container.

As one advantageous possibility, the current supplied by constant current source T4 will be twice that of T3, while that of T5 will be twice that of T4, that of T6 twice that of T5, and so on. Accordingly, as the binary counter counts up from zero, the magnitude of current supplied by the combined constant current sources T3 . . . T8 will increase in direct proportion.

Figure 2:
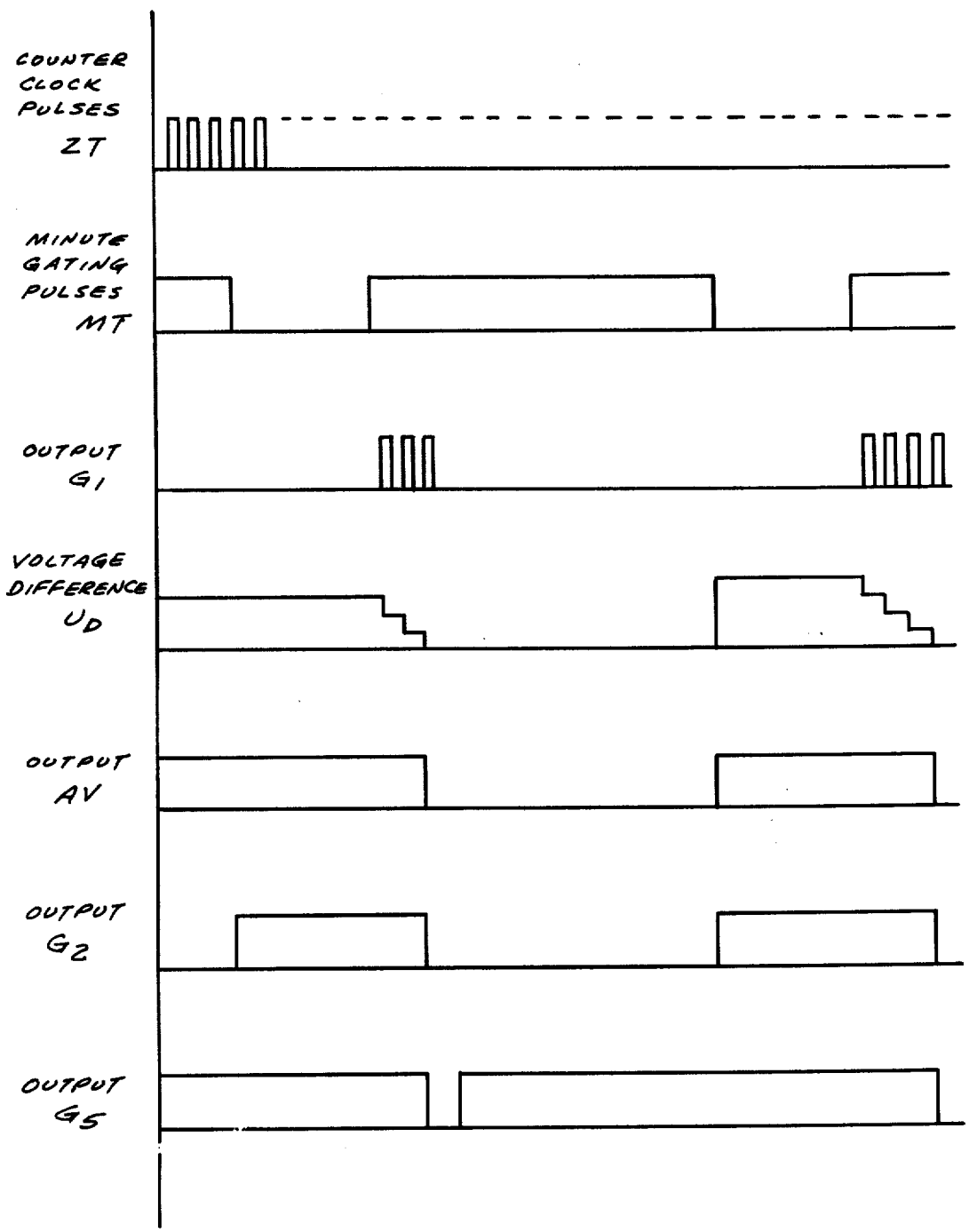
FIG. 2 depicts in graphical form the voltages at different circuit junctions in the circuitry of the apparatus.

Thus, as the counter counts up from zero, the voltage drop across temperature-independent resistor $R_V$ will rise in equal steps, and the voltage drop $V_D$ across the input of amplifier V will fall in equal steps toward zero, as shown in FIG. 2.

In FIG. 2 it will be seen that in the exemplary situation being described, the voltage difference $V_D$ reaches zero after three clock pulses have been applied to the clock pulse input of the binary counter. When $V_D=0$, it is evident that the voltage drop across $R_T$ and $R_V$ are equal. Accordingly, $$I_T R_T = I_V R_V$$

so that $$R_T = R_V I_V / I_T$$

from which it may be derivied that in general $$I_V = I_2 + \sum_{i=3}^{i=8} a_i I_i$$

wherein $a_i$ is equal to zero or unity, in dependence upon the logic signal at the respective output of the binary counter, and wherein $I_i$ has a binary-weighted value established by selecting the resistances of resistors $R_3$ . . . $R_8$. When $U_D$ becomes zero, the AND-gate G1 becomes blocked, and clock pulses applied to input ZT can no longer reach the clock pulse input of the binary counter.

This constitutes the end of the measurement operation. The count registered on the binary counter at this time equals the sum of the weighted currents $I_i$ and is accordingly indicative of the difference between the temperature of the temperature-dependent resistor $R_T$ and the reference temperature established by selection of the value of $I_2$. The compensation circuit, together with the amplifier, the gates and the counter together form an analog-to-digital converter operative for receiving the analog temperature-indicating signal developed by resistor $R_T$ when current $I_T$ is passed therethrough, and converting such analog signal into a binary signal on the outputs A to F of the binary counter.

Figure 3:
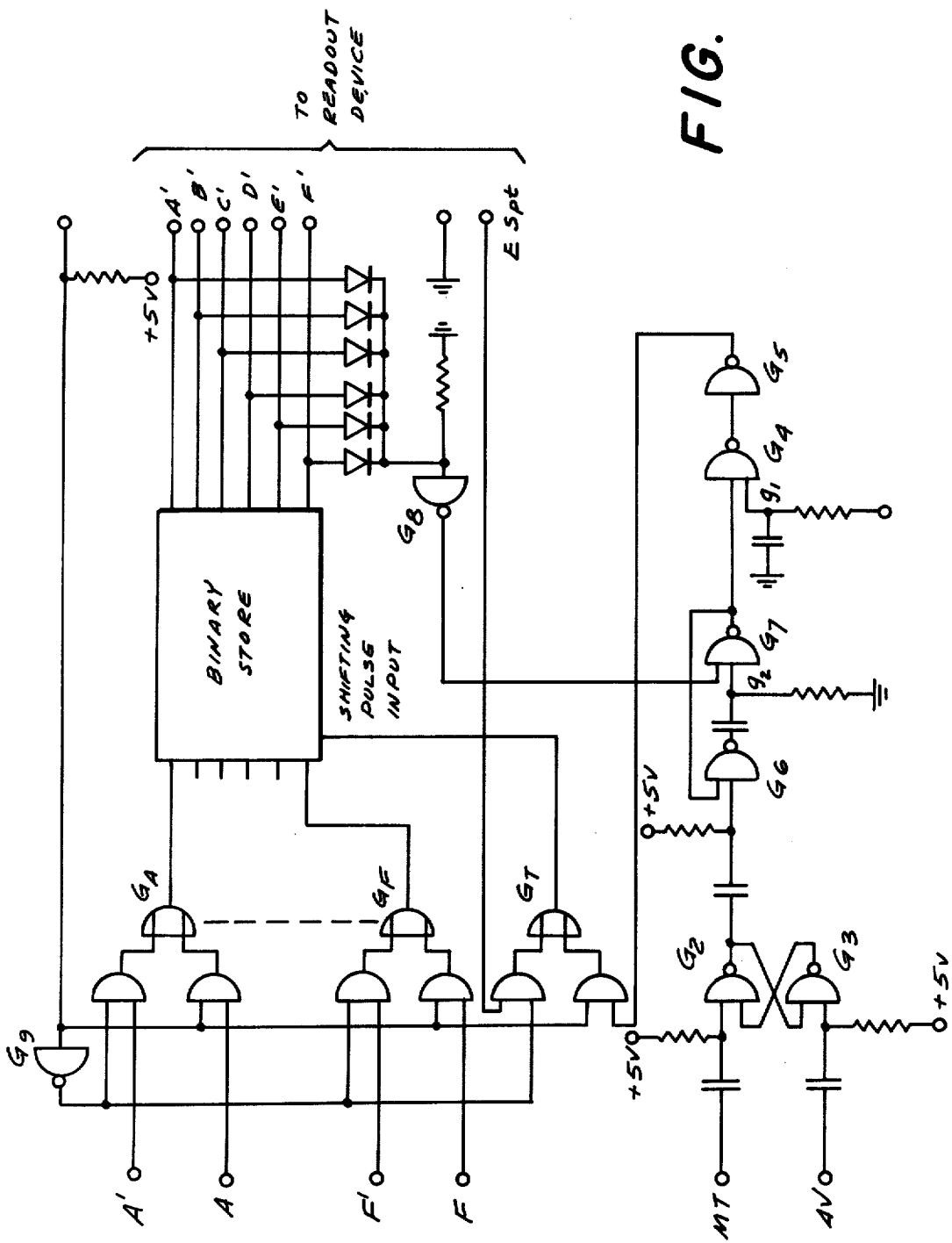
FIG. 3 depicts another part of the apparatus.

The circuit shown in FIG. 3 in conjunction with the circuitry shown in FIG. 1, excluding the temperature-responsive resistor $R_T$, constitutes buffer storage means connected to the temperature-responsive resistor $R_T$ and operative for receiving from the latter an analog temperature-indicating signal and furthermore operative for temporarily storing a corresponding signal indicative of the value of the analog temperature-indicating signal.

The outputs A to F of the binary counter shown in FIG. 1 are connected to the correspondingly designated inputs of the gating arrangement $G_A$ to $G_F$ of FIG. 3. The signals on counter outputs A to F are applied, via gates $G_A$ to $G_F$, to corresponding inputs of a binary store, in this embodiment in the form of six parallel shift registers. A five-volt biasing voltage is applied to the illustrated circuitry, and this biasing voltage results in the appearance of a logical "1" signal at the input of inverter gate $G_9$. This "1" signal enables the A to F AND-gates in the gate arrangement $G_A$ to $G_F$. The "0" signal at the output of inverter $G_9$ simultaneously disables the AND-gate having inputs A' to F', these AND-gates being subsequently enabled for a different purpose, as described further below.

The output of gate G2 of the flip-flop G2, G3 is at a positive potential, in response to the trailing edge of the minute gating pulse MT. When the compensation has been completed, i.e., when $U_D$ becomes zero, the "1" signal at the output AV of amplifier V terminates, and the trailing edge of that "1" pulse triggers the flip-flop G2, G3 to the state wherein a "1" signal appears at the output of gate G3 and a "0" signal at the output of gate G2. The transition from a "1" signal to a "0" at the output of gate G2 triggers monostable multivibrator G6, G7 to its unstable state, which in turn applies a signal to circuit G4, G5, which in turn results in the application via $G_T$ of a shifting pulse to the shifting pulse input of the binary store, permitting the six shift registers there to accept the six binary digits of the binary-coded number corresponding to the temperature measurement just taken, i.e., to register the count on the outputs A to F of the binary counter. Since the AND-gate G1 (FIG. 1) can be enabled only when $U_D$ is positive, only temperatures higher than the reference temperature are registered.

When it is desired to read out the binary store, the binary store is brought to a readout device at a remote cooler location. As one possibility, when the heating-insulating container housing the circuitry of FIGS. 1 and 3 is brought to the remote cooler location, the heat-insulating container may be opened so that the readout terminals of the binary store become accessible and can be connected to the inputs of a readout device. The binary store is read out via its outputs A' to F', upon receipt of pulses applied to the external shifting pulse input ESpt by the readout device itself and thereby applied to the gate arrangement $G_T$.

Resetting or erasing of all the information storage units in the binary store is accomplished by intermittently disconnecting the circuitry of FIG. 3 from the 5-volt biasing voltage source. Since the input $g_1$ of the gate G4 receives positive potential, delayed by the associated RC circuit, the shifting pulse input of the binary store has a few milliseconds of zero potential applied thereto via gate $G_T$.

The binary store is provided at its six outputs A' to F' with a circuit which protects against overflow. This protective circuit is comprised of the six illustrated diodes whose anodes are connected to the outputs A' to F', and is further comprised of the gate G8. When the binary store is full, a "1" signal, for example in the form of a positive potential, will exist on at least one of the six outputs A' to F'. This "1" signal will be applied to the input of inverter G8, at whose output will appear a "0" signal. This "0" signal is applied to gate G7, blocking the monostable multivibrator G6/G7, so that no further shifting pulses can be applied by the monostable multivibrator G6/G7 to the common shifting pulse input of the six parallel-connected shift registers in the illustrated binary store.

A further protective circuit is provided, comprised of transistor T11 (see FIG. 1) and the gate G3; this circuit prevents commencement of operation of the binary counter if the temperature-dependent resistor $R_T$ is not connected to the circuit in the illustrated manner. If temperature-dependent resistor $R_T$ becomes disconnected, then when the circuit illustrated in FIG. 1 is connected to power, the transistor T11 will be activated and thereby set the binary counter, via gate G3, to count zero.

If the temperature-dependent resistor is replaced by a thermoelement, then only a part of the circuitry of FIGS. 1 and 3 need be modified, to again produce a voltage varying in proportion to temperature, which will then be compensated by applying increasing currents through the temperature-independent resistor $R_V$. In the analog-to-digital converter circuitry of FIG. 1, it would then be necessary to employ the circuit elements $R_1$, $T_1$, $R_T$. The difference in the voltage supplied by a thermoelement $Th_T$ located in the very-high-temperature environment and the voltage supply by a thermoelement $Th_C$ maintained at a constant reference temperature would be amplified and compared with the voltage across the resistor $R_V$; that is, the voltage difference $V_D$ would again be formed.

When assembling together the Unit I shown in FIGS. 1 and 3 and the temperature-dependent resistor, and arranging the assembly for the measurement of temperature in canned-goods cans, for example to measure the temperature inside canned-goods cans in an autoclave, a number of considerations must be taken into account. The canned-goods can and the heat-insulating container in which circuit Unit I is contained are advantageously rigidly connected to each other. Although the temperature-dependent resistor must be inserted into the canned-goods can, the latter should nevertheless be tightly sealed. The connection between the temperature-dependent resistor and the heat-insulating container must likewise be sealed, and must have a certain flexibility. The temperature inside the can should not be significantly influenced by the insertion thereinto of the temperature-dependent resistor.

Figure 4:
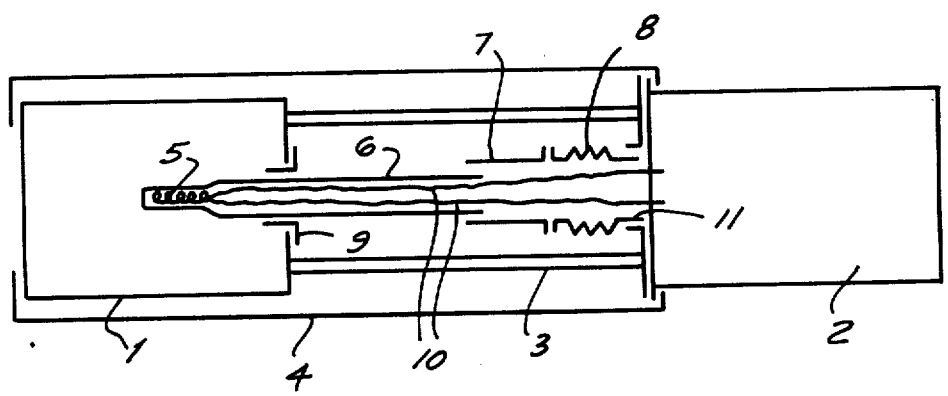
FIG. 4 depicts the manner in which part of the apparatus is connected to a temperature-sensitive element in a very-high-temperature environment.

An example of such an assembly and set-up is shown in FIG. 4. The can 1 and the heat-insulating container 2 are axially aligned and rigidly connected to each other by means of a schematically depicted clamping arrangement 4. The axial separation between the can 1 and the heat-insulating container 2 is established by a cylindrical spacing member 3. The temperature-dependent resistor is provided in the form of a glass-covered wire coil 5 melted onto a glass column 6. The glass member 6 projects into the can through a hole in the cover thereof, this entrance being tightly sealed by a sealing ring 9. The right-hand end of the glass pipe 6 is melted into position in a metallic sleeve 7, the right-hand flanged end of which is connected to a metallic bellows arrangement 8, in order to impart a certain flexibility to the connection. The right-hand end of the metallic bellows arrangement 8 is provided with a specially configured plug 11 which cooperates with a complementarily configured socket on the left-hand wall of the heat-insulating container 2 to form a seal-tight connection. Electrical connecting conductors 10, which depending upon the type of measuring set-up used may number up to four, lead from the temperature-measuring to the input of Unit I inside the heat-insulating container 2. The heat-insulating container 2 may be essentially comprised, for example, of a metal cylinder with a built-in Dewar vessel.

Figure 5:
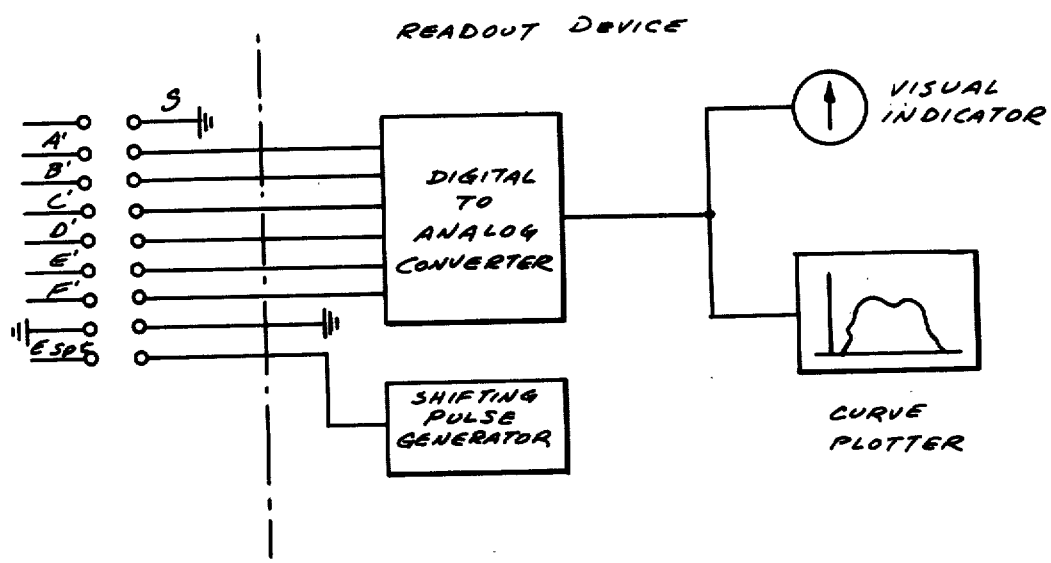
FIG. 5 depicts in schematic form an exemplary embodiment of a readout and recording device according to the invention.

FIG. 5 depicts one exemplary readout device. At the left-hand portion of FIG. 5 there are depicted the terminals of the circuitry of FIG. 3 to which the corresponding terminals of the readout device of FIG. 5 are connected. When these terminals are connected together, the grounding terminal S of the readout device causes a conversion of the gate arrangement $G_A \ldots G_T$, so that the electronic binary storage, comprised of the six parallel shift registers having a common shifting pulse input, can no longer register signals from the outputs A to F of the binary counter; this is because a "0" signal is now present at the input of inverter $G_9$, and "1" signal at the output thereof. As a further result of this, shifting pulses can be applied to OR-gate $G_T$ only from the readout device, via the line ESpt. In particular, the readout device of FIG. 5 is provided with a shifting pulse generator which can have any desired form, for instance an astable multivibrator, or a manually operated switch which must be manually activated each time a shifting pulse is to be generated. As these externally generated shifting pulses are applied to the common shifting pulse input of the six parallel shift registers in the binary counter of FIG. 3, successive six-digit binary numbers will appear at the outputs A' to F' of the six parallel shift registers. As these successive six-digit binary numbers appear at the outputs A' to F', in addition to being applied to the corresponding inputs of the digital-to-analog converter of FIG. 5, they are furthermore fed back to the information signal inputs of the six shift registers, so that the succession of six-digit binary numbers will not be erased at this time from the shift register circuitry, but will instead be registered anew, to be erased only when actually desired. This is advantageous because it may, for example be desired to read out the binary store more than once, for example by successively connecting the outputs of the electronic binary store to more than one readout device, performing respective different operations.

In any event, as the successive six-digit binary coded numbers appear on the outputs A' to F' of the binary store, they are applied to the digital-to-analog converter of FIG. 5, at the output of which there appear corresponding analog signals. These analog signals are applied to a visual indicator and to a curve plotter. The curve plotter may, for example, plot the analog signals along the vertical axis and advance in equal increments along the horizontal axis, for example, if the temperature measurements were originally made at equal time intervals.

Figure 6:
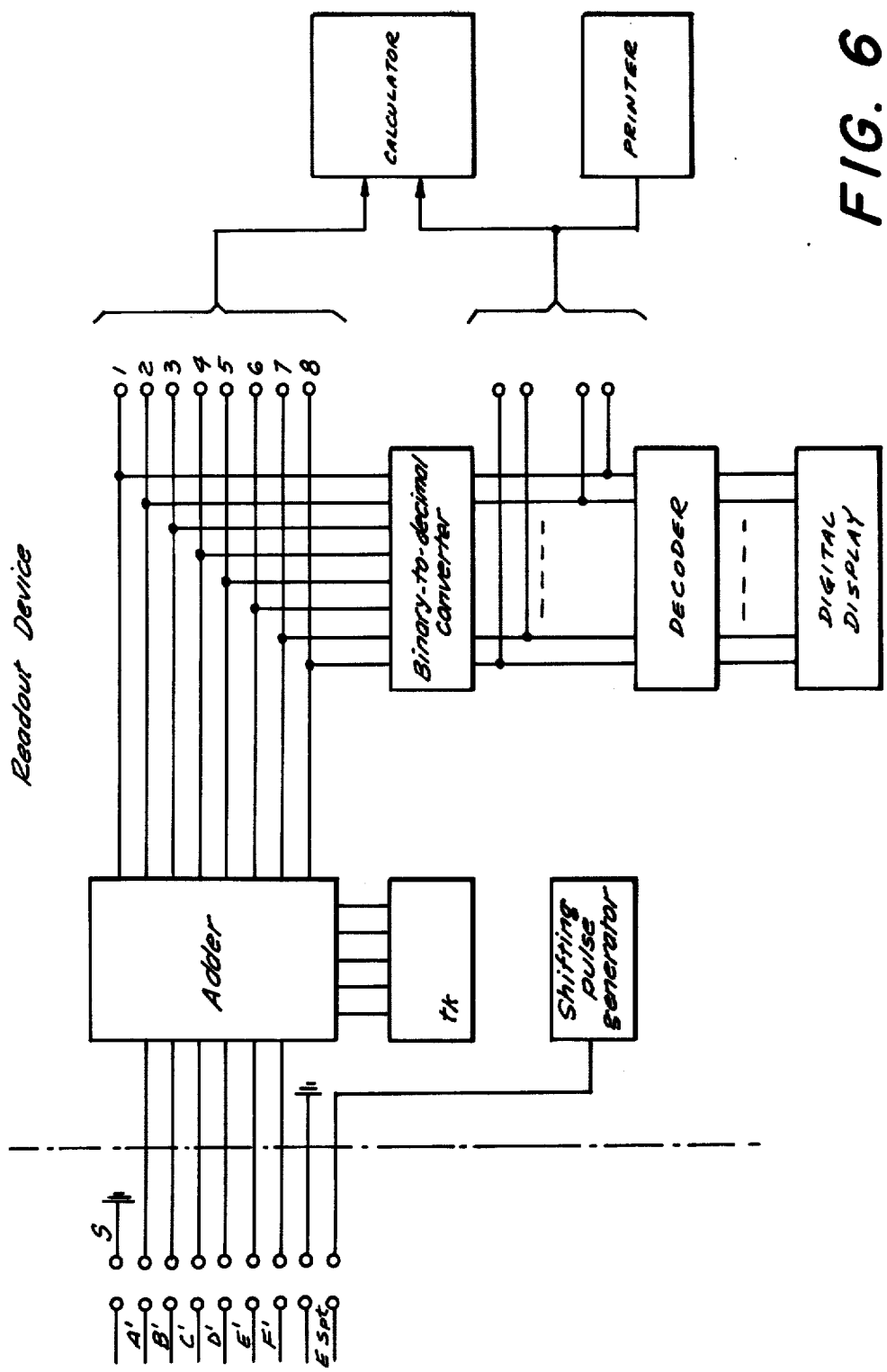
FIG. 6 depicts another such readout device.

FIG. 6 shows another somewhat more complicated readout device. Again, at the left-hand side of FIG. 6 are shown the terminals of the circuitry of FIG. 3 and the corresponding terminals of the readout device to which they are connected. The S terminal, the grounding terminal and the shifting pulse generator terminal which is connected to terminal ESpt in FIG. 6 correspond to the similarly designated terminals of the readout device of FIG. 5.

The shifting pulse generator of FIG. 6 applies shifting pulses to the common shifting pulse input of the shift registers in the binary store, and successive six-digit binary-coded numbers appear at the outputs A' to F' thereof, as explained with reference to FIG. 5. These signals are applied to the six inputs of the adder of FIG. 6. Since the compensation circuitry of Unit 1, shown in FIG. 1, operates with a suppressed null point for the sake of increased sensitivity, it is necessary to add to the binary-coded number on outputs A' to F' a further binary-coded number $t_k$ equal to the suppressed constant temperature. To this end, there is connected to the adder of FIG. 6 a circuit which can be adjusted to add to the binary-coded number on the six inputs of the adder to further binary-coded number $t_k$, the sum of the two numbers together constituting a binary-coded number appearing on the outputs 1 . . . 8 of the adder and having a value proportional to the measured temperature value, relative to a temperature null point of 0°C, for example. This eight-digit binary-coded number can be applied directly to the illustrated calculator circuit, which is entirely conventional and which may be programmed to perform a computation appropriate to the particular application, for example, computing averages, rates of change, maxima and minima, etc. In addition or alternatively, the eight-digit binary-coded number can be applied to a binary-to-decimal converter and thereafter applied in decimal form to the calculator and/or to a printer, for example to tabulate the successive measured temperature values. The number at the output of the binary-to-decimal converter can be furthermore applied to a decoder which controls a digital display device operative for displaying the measured temperature values in digital form.

It will be understood that each of the elements described above, or two or more together, may also find a useful application in other types of circuits and constructions differing from the type described above.

While the invention has been illustrated and described as embodied in a device for measuring the temperature inside canned-goods cans in an autoclave, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement for measuring temperature in a very-high-temperature environment, comprising, in combination, a heat-insulating container; temperature-responsive means located outside said heat-insulating container and operative for generating an analog temperature-indicating signal indicative of the temperature to which said temperature-responsive means is exposed; and electronic buffer storage means contained in said heat-insulating container so as to be insulated from the heat of the very-high-temperature environment, said electronic buffer storage means being connected to said temperature-responsive means and operative for receiving said analog temperature-indicating signal and temporarily storing a corresponding signal indicative of the value of said analog temperature-indicating signal for the purpose of subsequent readout of the stored signal by a readout device located in a cooler environment.

2. An arrangement as defined in claim 1, wherein said temperature-responsive means comprises means operative for generating said analog temperature-indicating signal in the form of an electrical signal.

3. An arrangement as defined in claim 2, wherein said electronic buffer storage means comprises means for receiving said analog temperature-indicating electrical signal and temporarily storing a corresponding electrical signal indicative of the value of said analog temperature-indicating signal.

4. An arrangement as defined in claim 1, wherein said electronic buffer storage means comprises analog-to-digital converter means connected to said temperature responsive means and operative for receiving said analog signal and converting the same into a corresponding digital signal indicative of the value of said analog signal, and means for temporarily storing said digital signal.

5. An arrangement as defined in claim 1, wherein said temperature responsive means comprises means operative for generating said analog temperature-indicating signal in the form of an electrical analog signal, and wherein said electronic buffer storage means comprises means for receiving said electrical analog signal and temporarily storing a corresponding digital electrical signal indicative of the value of said analog signal.

6. An arrangement as defined in claim 1, wherein said temperature-responsive means comprises means operative for generating said analog temperature-indicating signal in the form of an electrical signal, and wherein said electronic buffer storage means comprises analog-to-digital converter means connected to said temperature-responsive means and operative for receiving said analog signal and converting the same into a corresponding binary coded signal indicative of the value of said analog signal, and means for storing said binary coded signal.

7. An arrangement as defined in claim 1, wherein said temperature-responsive means comprises means operative for generating said analog temperature-indicating signal in the form of an electrical signal, and wherein said electronic buffer storage means comprises analog-to-digital converter means connected to said temperature-responsive means and operative for receiving said analog signal and converting the same into a corresponding binary coded signal indicative of the value of said analog signal, and means for storing said binary coded electrical signal.

8. An arrangement as defined in claim 1, wherein said temperature-responsive means and said electronic buffer storage means are disconnectably connected to each other so that said heat-insulating container can be removed to a cooler environment for the purpose of readout of the stored signal by a readout device located in the cooler environment while leaving said temperature-responsive means in the very-high-temperature environment.

9. An arrangement as defined in claim 1, wherein said heat-insulating container includes a body of material of higher specific heat than said electronic buffer storage means.

10. An arrangement as defined in claim 1, wherein said heat-insulating container includes a body of material of low melting point and high heat of melting.

11. An arrangement as defined in claim 1, wherein said electronic buffer storage means comprises a source of current and intermittently operating electronic circuitry operative for receiving said analog signal and temporarily storing said corresponding signal, whereby to achieve a lower energy consumption and heat generation in said heat-insulating container than would be the case with continuously operating electronic circuitry.

12. An arrangement as defined in claim 1; and further including a readout device connectable to said electronic buffer storage means and operative for receiving said corresponding signal and converting the same into a visual display.

13. A method of measuring temperature in a very-high-temperature environment, comprising, in combination, the first step of placing in the very-high-temperature environment temperature-responsive means operative for generating an analog temperature-indicating electrical signal indicative of the temperature to which the temperature-responsive means is exposed and also placing in the very-high-temperature environment a heat-insulating container containing an electrical-energy-consuming electronic buffer storage circuit generating heat during operation and protected by the container from the heat of the very-high-temperature environment and electrically connected to the temperature-responsive means and operative for receiving the analog temperature-indicating signal and temporarily storing a corresponding signal indicative of the value of the analog temperature-indicating signal; and the second step of subsequently bringing the electronic buffer storage circuit into a cooler environment and there connecting to the buffer storage circuit an electrical-energy-consuming readout device generating heat during operation and reading out the signal stored by the electronic buffer storage means, whereby to avoid the faster temperature buildup which would result in the heat-insulating container if the readout device were included therein.

14. A method as defined in claim 13, wherein said second step comprises maintaining said electronic buffer storage circuit electrically connected with said temperature-responsive means and bringing both said temperature-responsive means and said electronic buffer storage circuit into said cooler environment.

15. A method as defined in claim 13, wherein said second step comprises disconnecting said electronic buffer storage from said temperature-responsive means before bringing said electronic buffer storage circuit into said cooler environment.

* * * * *